Feb. 17, 1925.
W. A. NOURIE
BELT CONNECTER
Filed April 16, 1924
1,527,063
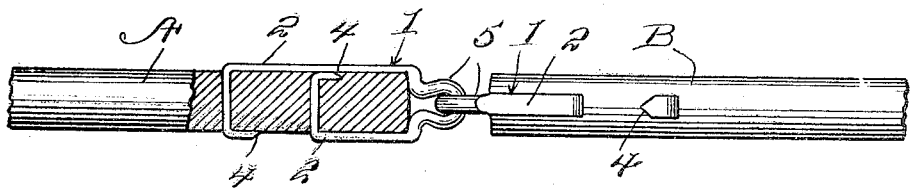
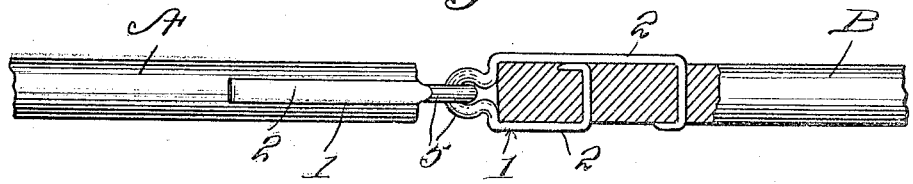
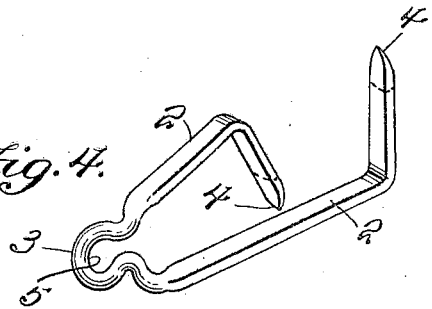
Wendell A. Nourie
INVENTOR
BY Victor J. Evans
ATTORNEY
WITNESS:

Patented Feb. 17, 1925.

1,527,063

UNITED STATES PATENT OFFICE.

WENDELL A. NOURIE, OF KANKAKEE, ILLINOIS.

BELT CONNECTER.

Application filed April 16, 1924. Serial No. 706,971.

*To all whom it may concern:*

Be it known that I, WENDELL A. NOURIE, a citizen of the United States, residing at Kankakee, in the county of Kankakee and State of Illinois, have invented new and useful Improvements in Belt Connecters, of which the following is a specification.

This invention relates to a belt connecter designed for connecting together the ends of a round belt, the general object of the invention being to provide a pair of bars, each having its ends sharpened and adapted to be passed through the belt end, portions of the bars being rounded and adapted to be bent to form eyes for engaging each other.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view partly in section showing how the belt ends are connected together.

Figure 2 is a similar view but taken at right angles from Figure 1.

Figure 3 is a view of one of the bars before it is bent.

Figure 4 is a perspective view of one of the bars.

Figure 5 is a view taken at right angles to Figure 3.

In these views, A and B are the ends of the belting to be connected together and 1 indicates the connecting device attached to each belt end. Each device is formed from a strip of metal which has its end portions 2 of flat formation and its intermediate portion 3 of round formation. One of the flat portions is of less length than the other portion and the extremities are sharpened, as shown at 4, so that they can pass through the belting. The round portion is looped to form an eye 5 which is adapted to engage the eye on the other member as shown in Figures 1 and 2 and the flat portions extend parallel for a distance and engage opposite sides of the belting and the said flat portions are bent at right angles and driven through the belt and their extremities bent again at right angles to engage the sides of the belt. As one flat portion is shorter than the other the portions will pass through the belt at different points, as shown in Figures 1 and 2 and the extremity of the short portion will lie under the main part of the flat portion when the device is in position.

It will thus be seen that I have provided simple means for connecting together the ends of a belt and one in which the penetrating members are spaced apart so that the belt is not weakened.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A belt connecter comprising a pair of members each composed of a strip of material and a rounded intermediate portion and flattened end portions, one end portion being of greater length than the other portion with the extremities sharpened, the rounded portion being bent to form an eye and the flattened portions bent at right angles to form parallel parts engaging the sides of the belt and penetrating parts which pass through the belt at different points.

In testimony whereof I affix my signature.

WENDELL A. NOURIE.